INVENTORS
RICHARD B. C. TUCKER
ROLAND N. FRACALOSSI
WILLIAM C. CRAWFORD
JOSEPH S. SOLLERS

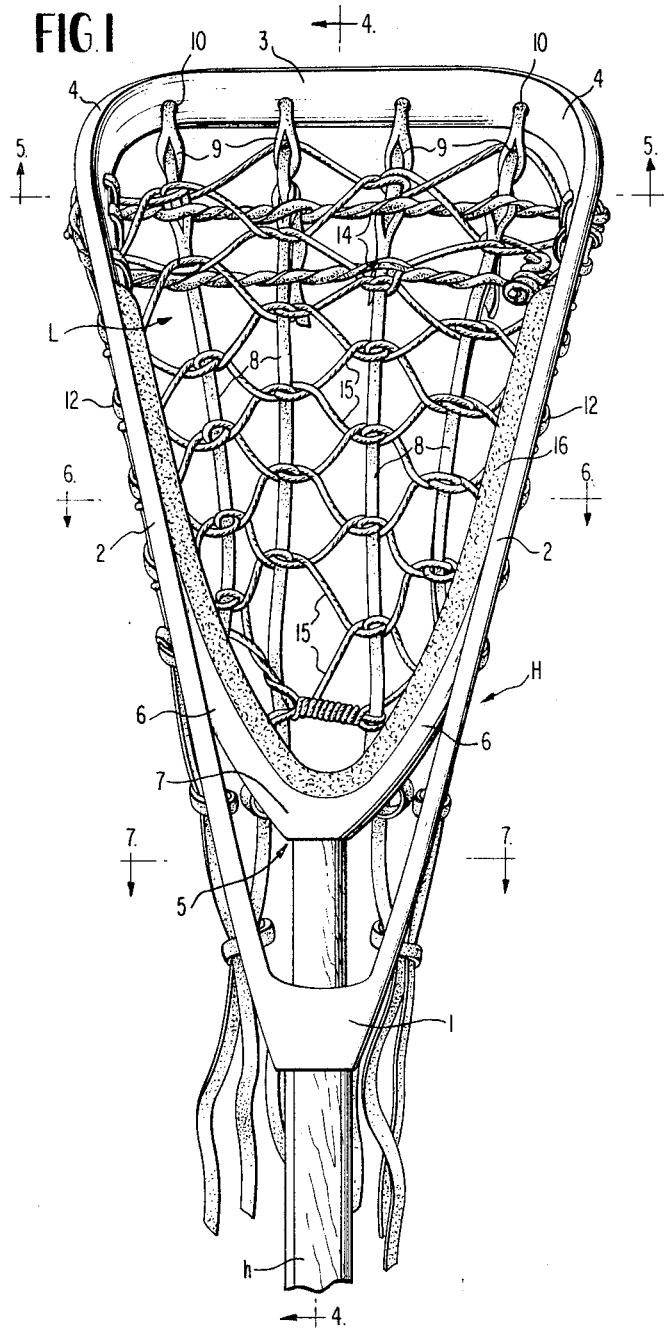
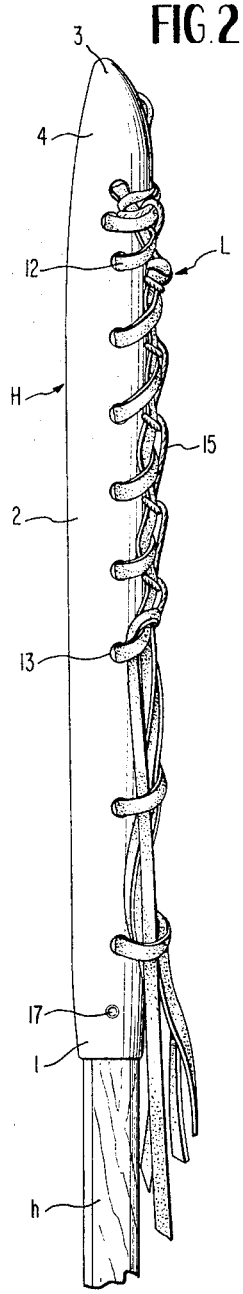
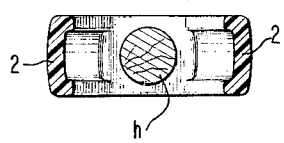
INVENTORS
RICHARD B. C. TUCKER
ROLAND N. FRACALOSSI
WILLIAM C. CRAWFORD
JOSEPH S. SOLLERS
BY Baldwin Wight Diller & Brown
ATTORNEYS April 21, 1970 R. B. C. TUCKER ET AL 3,507,495
LACROSSE STICK Filed June 1, 1967 4 Sheets-Sheet 2

BY *Baldwin Wight Diller & Brown*
ATTORNEYS

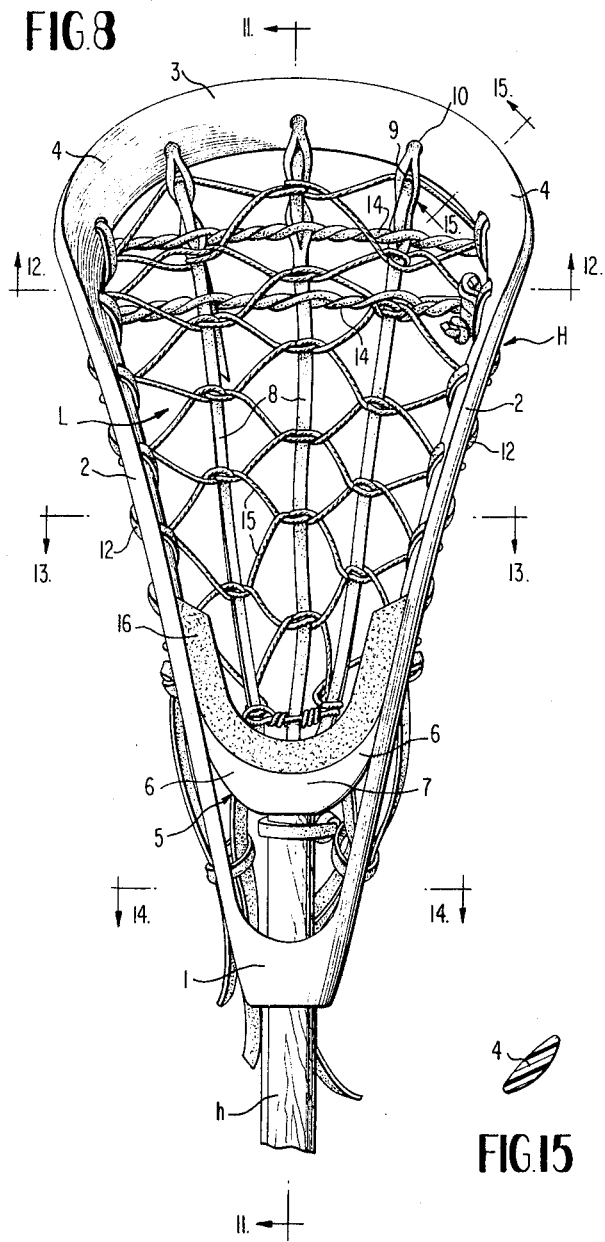
FIG.8
FIG.15
FIG.14
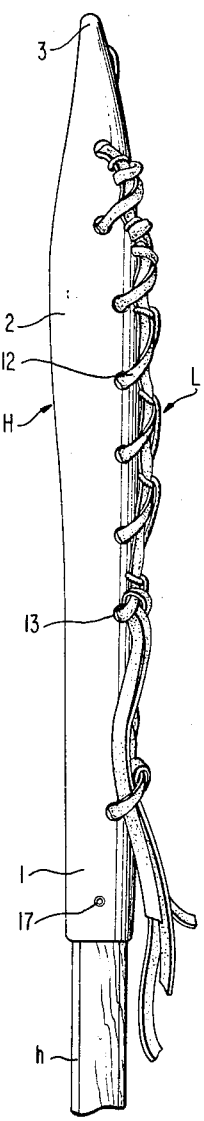
FIG.9
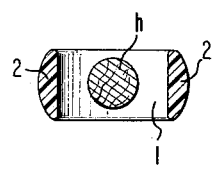
INVENTORS
RICHARD B. C. TUCKER
ROLAND N. FRACALOSSI
WILLIAM C. CRAWFORD
JOSEPH S. SOLLERS
BY Baldwin Wight Diller & Brown
ATTORNEYS April 21, 1970 R. B. C. TUCKER ET AL 3,507,495

LACROSSE STICK

Filed June 1, 1967 4 Sheets-Sheet 4

INVENTORS
RICHARD B. C. TUCKER
ROLAND N. FRACALOSSI
WILLIAM C. CRAWFORD
JOSEPH S. SOLLERS

BY *Baldwin Wight Willer & Brown*

ATTORNEYS

United States Patent Office 3,507,495
Patented Apr. 21, 1970

3,507,495
LACROSSE STICK
Richard B. C. Tucker and Roland N. Fracalossi, Baltimore, Md., William C. Crawford, Skillman, N.J., and Joseph S. Sollers, Lutherville, Md., assignors to Wm. T. Burnett & Co. Incorporated, Baltimore, Md., a corporation of Maryland
Filed June 1, 1967, Ser. No. 642,882
Int. Cl. A63b 59/02
U.S. Cl. 273—96                  20 Claims

ABSTRACT OF THE DISCLOSURE

A substantially shatterproof lacrosse stick head has a closed pocket delineated by a transverse top wall and two side walls diverging upwardly and outwardly from a throat toward the top wall, the head components being formed of an elastomer characterized by toughness, impact resistance and limited flexibility. A stop having divergent sides and similar physical properties is positioned within the head proper and has upwardly-outwardly divergent stop walls. A layer of relatively soft resilient material is positioned on the inner surface of the stop. A handle is detachably connected to the head.

---

This invention relates to lacrosse sticks, and more particularly to lacrosse sticks having heads so formed and constituted as to eliminate shortcomings in prior art lacrosse sticks.

As is well known, lacrosse is a very ancient game. As far back as can be determined in point of time, the sticks have almost always been made of wood, usually hickory, shaped by hand by American and Canadian Indians with whom the game originated. Although there have been proposals to make lacrosse sticks by more modern methods and, for example, of laminated wood, by far the bulk of lacrosse sticks used today are made from solid wood and in the ancient handcrafting way. The result persists that lacrosse sticks generally available at this time vary materially as to quality, lack of uniformity, susceptibility to changing in shape and physical properties with changing weather conditions, and perhaps most important of all, susceptibility, to breaking, even shattering, so as to produce jagged fractures, extremely dangerous to players in a game known to be so roughly played. As to lack of uniformity, the making of the sticks not only varies, but the wood itself varies to such an extent that the stick weight, balance and durabilty cannot be controlled within satisfactory limits. So lacking in uniformity are present day sticks that when even an experienced player uses a stick for the first time he is unable to handle the stick with the dexterity which can come only with long use of the stick by a particular player and his becoming accustomed to its feel and balance. It is so well recognized that this lack of uniformity of sticks now generally available presents a significant problem to players that equipment or supply men for many teams keep on hand an assortment of sticks, many more than the number used in play at any time, from which players may pick out a stick having a size, configuration, balance and feel most closely approaching the same characteristics of the stick which he has been using. A still further disadvantage of lacrosse sticks produced as now common is that the necessity of keeping a large supply of sticks on hand and replacing entire sticks when only a part has been broken creates a substantial economic problem.

An object of the present invention is to overcome the aforementioned and other ancillary disadvantages of lacrosse sticks now generally available, and more particularly to provide a lacrosse stick having improved feel, life, balance, durability, uniformity and economy of manufacture, adaptability to modification for use by different players or even the same players playing the different positions, i.e. attack, defense, or goalie, from time to time, and, of very great importance, minimal susceptibility to breaking or shattering, thus eliminating one of the great dangers of a rough game.

Other objects will become apparent from a reading of the more detailed description to follow, the appended claims, and the accompanying drawings in which:

FIGURE 1 is a front elevational view of a lacrosse stick, more particularly for use by defense men, embodying the invention as viewed when looking through the pocket provided by the stick head which receives the game ball, a portion only of the handle being shown;

FIGURE 2 is a side elevational view showing the stick when looking from the right of FIGURE 1;

FIGURE 7 is a transverse section on the line 7—7 of FIGURE 1 near the bottom of the head;

FIGURE 8 is a side elevational view similar to FIGURE 1, but showing a modified form of head, more particularly for use by attack men;

FIGURE 9 is a side elevational view of a stick shown in FIGURE 8 as seen when looking from the right of FIGURE 8;

FIGURE 14 is a transverse section on the line 14—14 of FIGURE 8 near the bottom of the head; and FIGURE 15 is a detailed section on the line 15—15 of FIGURE 8.

Figure 4:
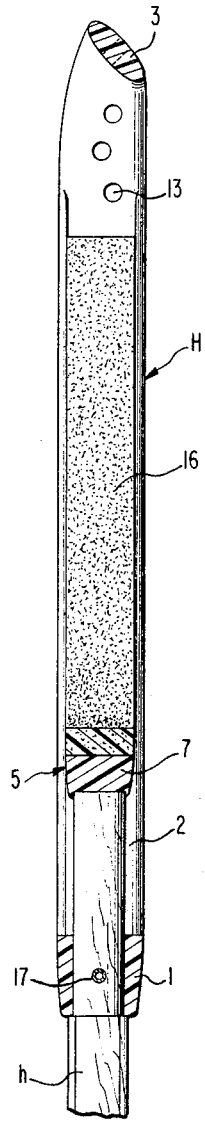
FIGURE 4 is a longitudinal section on the line 4—4 of FIGURE 1.
Figure 3:
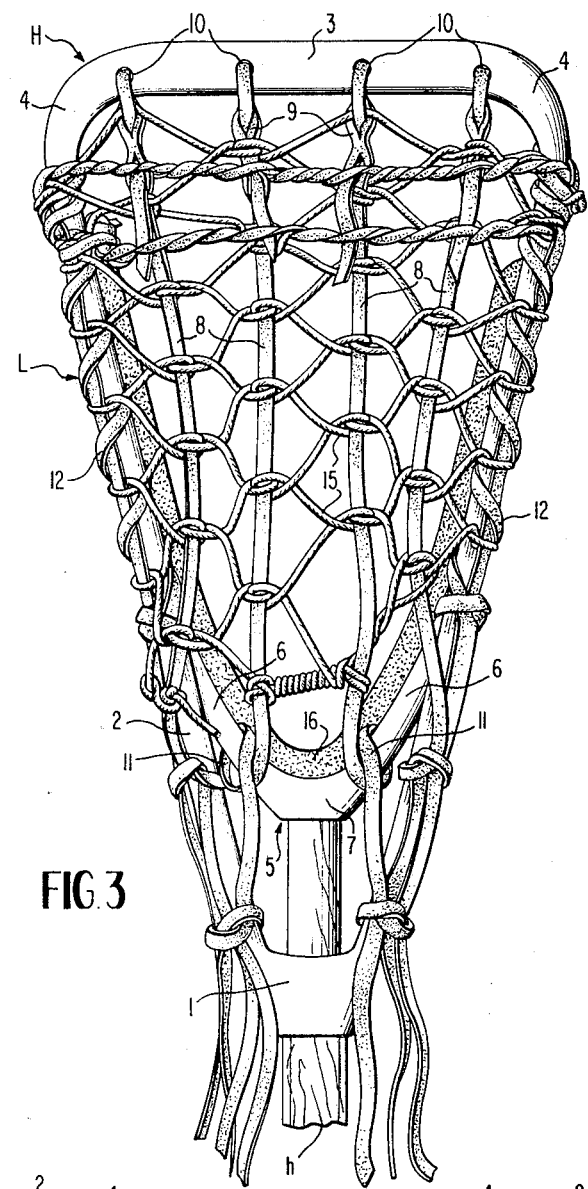
FIGURE 3 is a rear elevational view of the stick shown in FIGURES 1 and 2.

The lacrosse stick shown in FIGURES 1-7, more particularly sized and proportioned for use by defense players, comprises a head generally designated H, lacing or netting generally indicated at L, and a handle *h*. The end of the head H at the top as viewed in the drawings will be referred to as the top of the stick in the following description, although, of course, when used in play that end will not necessarily always be held uppermost.

The head H is, in general, a closed frame-like construction of somewhat V-shape, preferably substantially symmetrical. The bottom or lower end of the head is formed as a throat 1 from which two side walls 2, 2, joining at the throat, are inclined and diverge upwardly and outwardly. The upper ends of the side walls 2, 2 are connected by a transverse top or end wall 3 which merges with the side walls 2, 2 through intervening smoothly curved portions 4, 4. As most clearly shown in FIGURE 4, the transverse top wall 3 is flattened into the cross sectional form of a thin oval the major axis of which is inclined to the general plane of the head. Such an inclination is desirable for facilitating the fielding of ground balls.

Figure 5:
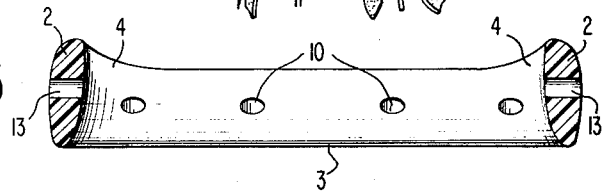
FIGURE 5 is a transverse section on the line 5—5 of FIGURE 1 near the top of the lacrosse stick head.
Figure 6:
FIGURE 6 is a transverse section on the line 6—6 of FIGURE 1 more nearly at the center of the longitudinal extent of the head.
Figure 11:
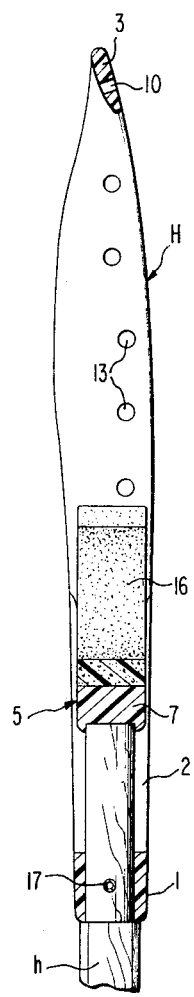
FIGURE 11 is a longitudinal section on the line 11—11 of FIGURE 8.
Figure 10:
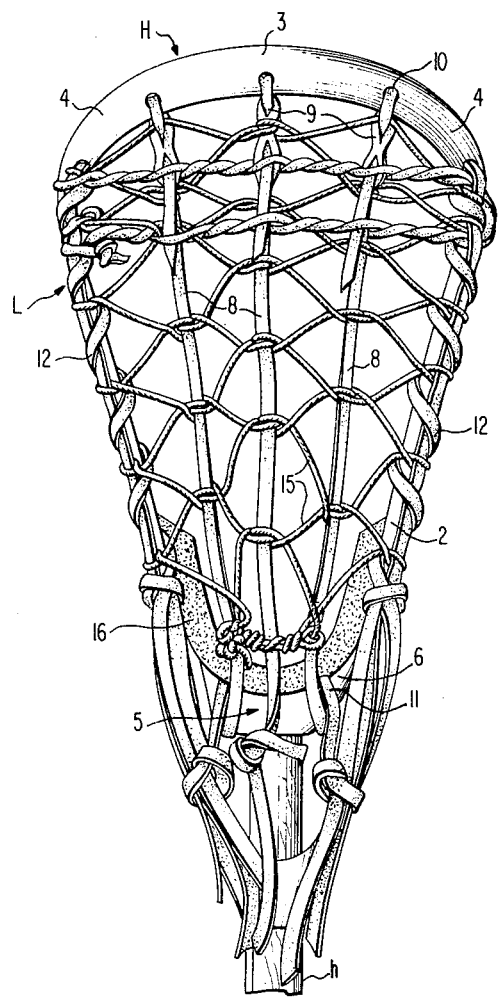
FIGURE 10 is a rear elevation of the stick shown in FIGURE 8.
Figure 13:
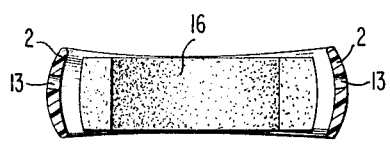
FIGURE 13 is a transverse section on the line 13—13 of FIGURE 8 more nearly at the longitudinal center of the head.
Figure 12:
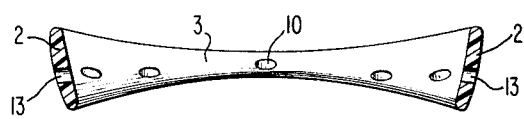
FIGURE 12 is a transverse section on the line 12—12 of FIGURE 8 near the top of the lacrosse stick head.

The cross section of each head side wall 2 varies as is particularly clear from comparison of FIGURES 7, 6 and 5. Adjacent to the head bottom or throat 1, the side walls 2, 2 are channel shaped in cross section, the channel depressions facing inwardly of the head and toward each other. The channel shaped cross section continues upwardly through the mid-portion of the head illustrated in FIGURE 6, and dies out into a more nearly flat but slightly convex inner surface near the top of the head as shown in FIGURE 5.

In accordance with the invention, the head includes a stop generally designated 5 within and spanning the space between the side walls 2, 2 adjacent to the lower part of the head. The stop, which also is generally of V-shape, has side walls 6, 6 which join each other at the bottom or root 7 of the stop, the stop side walls diverging upwardly and outwardly and preferably being formed integrally with but alternatively secured to the head side walls 2, 2. Desired limited or controlled flexibility of the head H in its entirety is enhanced by positioning the stop 5 so that its root 7 is spaced above the throat 1 toward the transverse top wall 3. This provides a sort of open truss constituted by the lower portions of the head side walls 2, 2 and throat 1, the stop 5, and the part of the handle h intervening between the throat 1 and the stop root 7. The truss provides strength at the point of heavy strains, yet has a desired amount of limited flexibility.

Lacing or netting L is connected to the head H to provide the pocket in which the game ball may be caught and carried and from which it may be thrown. The lacing includes longitudinal thongs 8, e.g. of leather or suitable substitute, which are slit near their upper ends to provide loops 9. The thongs 8 are passed through holes 10 in the transverse top wall 3 and are then passed through the loops at 9 and extended downwardly substantially parallel to each other. The two innermost thongs 8 are looped at 11 through holes in the stop 5 and are then extended downwardly and secured to the head by anchoring strips 12 which are wrapped through holes 13 in the head side walls 2. The two outer thongs 8 pass behind the stop 5 without necessarily being looped through or secured to the stop, and are secured to the head at their lower ends by the anchoring strips 12.

Adjacent to the top of the head, there are two heavy twisted double thongs 14, e.g. of leather or rawhide, which pass transversely behind the head side walls 2, 2 and are secured to the latter by the anchoring strips 12 wrapped to the side walls 2. The two components of each double thong 14 embrace the longitudinal thongs 8 so that the twisting of the thongs 14 locks these thongs to the longitudinal thongs 8.

Transverse lacing 15, preferably cordage, e.g. nylon, extends generally horizontally between the side walls 2, 2, but is so interlaced or intertwined with itself and with the longitudinal thongs 8 as to provide a wavy formation of the cordage 15 and a reticulate pocket. The transverse lacing components 15 are secured to the head side walls 2, 2 by the anchoring strips 12.

Markedly improved ball handling properties are obtained by providing a layer 16 of relatively soft resilient material inside the stop 5. The layer 16, which may for example be of elastomeric material such as foamed rubber or polyurethane foam, may be cemented to the inside bottom and stop side walls within the channel depression in the latter. In the construction shown in FIGURES 1–7, the relatively soft resilient layer 16 is extended beyond the upper ends of the stop side walls 6 and is secured to the inside of the head side walls 2, terminating approximately at the lower of the two twisted thongs 14. The layer 16 of soft resilient material provides for better cradling and carrying of the ball with less jiggling and bouncing.

The handle h is detachably connected to the head H so as to enable a broken handle to be replaced with minimum expense. Players having preferences as to handle sizes or materials or shapes where gripped, may select a handle most suited to their preferences while still using the same head. In the form shown, the upper end of the handle is passed through an opening in the head throat 1 and is extended into the bottom of the stop 5, a pin 17 passing laterally through the throat 1 and the handle maintaining the latter firmly connected to the head.

The material forming the head, which in a sense includes the stop 5, must have physical properties providing, inter alia, toughness, impact resistance and limited flexibility as well as shatterproof qualities. The preferred material is a moldable elastomer of a composition and having been treated to have these properties. The preferred materials are urethane elastomers which may be well known in the art, and are made from reactants which are normaly blended in the liquid state and cast into suitable molds where they are heated to produce the cured and shaped lacrosse stick heads. The elastomers can be derived from polyester and/or polyether glycols reacted with organic polyisocyanates and further cured with low molecular weight polyols or polyamines. Cast elastomers based on poly (1,4-oxybutylene) glycol and tolylene diisocyanate reacted to form prepolymers containing isocyanate groups and further cured with an organic diamine such as 4,4'-methylene-bis-(2-chloroaniline) are well suited to produce hard and rubbery solids having excellent strength, toughness and abrasion-resistance. Urethane elastomers can be prepared having hardness values ranging from 10 to 95 (Shore durometer A) to 50–75 (Shore durometer D). Elastomers in the high hardness range 60–75 (Shore D) are preferred to produce the urethane components of the lacrosse stick head, since they provide high tensile and tear strengths and sufficient flexural modulus to give the head the rigidity and resilience required for proper handling and play in the game. In addition to the excellent physical properties imparted to the lacrosse stick head by the urethane components, the ability to utilize a liquid casting technique in combination with molds of controlled size and shape enables production of lacrosse stick heads of uniform structure and weight. Conventional lacrosse stick heads made from hickory wood are notorious for their variation in size, shape and weight when made in any of the types used in the game, e.g. attack stick, defense stick, goalie stick. The lacrosse stick head of the present invention can be produced under precisely controlled conditions which apply to the chemical process, the molding system and the ambient, atmospheric conditions.

The complete process involves several operations which are performed in proper sequence and in combination to produce the finished product of this invention. The first requirement is to establish a model or prototype having the size and structure which is desired in the finished lacrosse stick head or frame. These requirements vary, depending upon the use to which the lacrosse stick is put in the game. For example, a smaller and lighter lacrosse stick head is conventionally used by the offense or attack players, whereas the defense elements prefer a larger and heavier head. Since the finished lacrosse stick head of this invention is molded to exact and reproducible dimensions, once the model and its conforming mold are proportioned and produced, the desirable structural features in the finished part are precisely determined.

The model can be made from wood, plastic, or any solid, impervious material, and it has been found that a satisfactory mold can be made from a solid urethane elastomer. The procedure is to cast liquid urethane components about the model which is positioned appropriately in a small box open at the top only. The mold is made in two parts, casting firstly the lower half which is cured and hardened, applying release agents, and then casting the upper second half. The mold sections are cured at e.g., approximately 212° F. for one or two hours. Consequently, it is important that the model withstand this temperature without deformation or rupture. When fully cured, the solid, urethane provides a simple two-part mold having mechanical strength and heat resistance and which reproduces accurately the configuration of the model. Subsequent lacrosse stick heads cast in this type mold are excellent reproductions of the original model.

Casting liquid urethane elastomers prepared by the prepolymer method or the direct, so-called one-shot technique, is well known in the art. A typical procedure involves several steps. In the case of the prepolymer method, a weighed amount of prepolymer having an isocyanate content approximately 9½% is heated to 100° C. and degassed at high vacuum for ten minutes. At the same time a diamine curing agent such as 4,4'-methylene-bis-(2 chloroaniline), having a melting range of 100–109° C., is heated until fluid and maintained at 125° C. The urethane mold is held at 100° C. The prepolymer is then cooled to about 80° C. and thoroughly mixed with the curing agent. In the preferred mixtures wherein the pot life is in the order of 1½ minutes, it is desirable to fill the mold within 15 to 20 seconds to insure good flow of the mixture whose viscosity increases rapidly as polymerization proceeds. A silicone-type release agent is applied to the two halves of the mold prior to filling.

It is convenient to pour the mixture through a small hole in the mold located at the tapered end corresponding to the throat of the lacrose stick head where the handle is to be attached, so that the mixture flows downwardly through the opening corresponding to one side wall of the head, then flows laterally along the very top wall of the head and continues up the other side wall, pushing the air within the mold ahead of it until the section forming the stop is completely filled. A small bleed hole in the stop permits the air to escape and the entire section to be filled completely with polymer. Pouring is continued until the liquid mixture fills the entire mold, including the small pour hole at the top. A small section of translucent tubing inserted in the bleed hole in the stop receives a small excess of the polymer and indicates visually that filling is complete to that point. Maintaining the mold at a temperature of 100° C. facilitates the filling operation, since it helps to maintain the fresh mixture at lower viscosities. However, filling must be accomplished within a short period, e.g. 15–20 seconds, after which viscosity build-up is rapid.

The mold is then moved into a heating chamber held at 100° C. and pre-cured for 15–20 minutes. During this period the liquid urethane components have gelled into a rubbery solid having sufficient tenacity and flexibility that the head can be demolded easily before the polymer has attained its maximum hardness. In this manner, not only is demolding facilitated, but the molding cycle is shortened, which enables greater production. The freshly removed lacrosse stick head is cured further at 100° C. for 2 to 3 hours to insure complete cure and optimum properties. Where it is practical to reduce pot life and demolding time, specific reactive agents like methylene dianiline can be blended with the 4,4'-methylene-bis-(2 chloroaniline) curing agent, or catalysts like the carboxylic acids, e.g. adipic acid, can be incorporated with the principal components. Under these accelerated processing conditons, less reactive prepolymers can be used, or even blends of prepolymers of varying reactivity can be selectively used. If a longer pot life is desired, it is possible to use hindered aromatic primary diamines in place of the 4,4'-methylene-bis-(2 chloroaniline) to increase pot life by a factor from four to six without any significant increase in the demolding time.

The lacrosse stick heads of this invention can be processed satisfactorily by either a batch type hand-mixing procedure or by commercially available intermittent mixing machines. The latter process is preferred for reasons of capacity and economy, but either process yields lacrosse stick heads of comparable strength and quality.

A preferred formulation is given below. This formulation can be used to cast various sizes and shapes of the lacrosse stick heads.

| | Parts by weight |
|---|---|
| Adiprene L–315 [1] | 100 |
| 4,4'-methylene-bis-(2 chloroaniline) | 26 |

[1] Adiprene L–315 is Du Pont's trade name for a prepolymer based on poly(1,4-oxybutylene)glycol and tolylene diisocyanate. The prepolymer has the following specifications:
Available isocyanate content, percent—9.45 plus or minus 0.20.
Specific gravity at 75° F.—1.11.
Brookfield viscosity at 86° F.—15,000 plus or minus 2,500.

Pigments can be added to the formulation to produce lacrosse stick heads of different color. The pigment can be combined with the prepolymer before the material is heated and degassed. They can be added in the form of finely ground powders or as dispersions in epoxy resins.

The percent theoretical equivalent of 4,4'-methylene-bis-(2 chloroaniline) given in the formulation above is about 90%. At this level the tensile strength, impact resistance, and flexural strength are maximized and the properties imparted to the elastomer are satisfactory for use in the lacross stick head. Test speciments of this elastomer were conditioned for one week at 75° F., 50% relative humidity, and then tested and the following physical properties determined:

| | | |
|---|---|---|
| Hardness, Shore durometer D. | 75 | ASTM D 1484–59. |
| 100% modulus, p.s.i. | 4,300 | ASTM D 412–61T, rate of pull is 1 inch per minute. |
| Tensile strength, p.s.i. | 11,000 | |
| Elongation at break, percent. | 270 | |
| Tear strength, lb./in. | 116 | ASTM D 470–59T. |
| Compression set, percent | 9 | ASTM D 395–61, Method A, 22 hours at 158° F. under 1,350 p.s.i. load. |
| Abrasion resistance (NBS index). | 435 | ASTM D 1630–61, National Bureau of Standards Abrader. |
| Flexural modulus, p.s.i. | 114,500 | ASTM D 797–58, 75° F., 75 mils thick sample. |
| Impact resistance, ft.-lbs./in. | 15 | ASTM D 256–56 Method A, notched Izod. |
| Resilience, rebound Bashore, percent. | 48 | |

NOTE.—NBS designates National Bureau of Standards; ASTM designates American Society for Testing Materials.

The utilization of an elastomeric material having high flexural modulus together with the double-walled structure provides a lacrosse stick head that is both tough and safe. Although hard and stiff like hickory wood and various structural plastics, the lacrosse stick head of this invention will perform the rigorous functions demanded by the game, but since it is made from an elatsomer, it has built-in safety features not found in conventional wood or plastic heads. The present lacrosse stick head will deform slightly and recover, and will absorb shock when impacted or otherwise stressed, features which tend to reduce the force of contact betwen opposing players. Additionally, the elastomeric head will not break or shatter, thus helping to prevent possibly serious injuries.

The foregoing description of the material and procedure in manufacturing has had reference to the head H including the throat 1, side walls 2, top wall 3 and stop 5. As previously stated, the layer 16 of relatively soft resilient material may be constituted by an elastomer such as foamed rubber or foamed polyurethane.

Among other advantages of lacrosse sticks according to the present invention are its superior "life" and good "feel" which might be considered intangible but which are very definitely discernible to experienced players; better adaptability to picking up ground balls; and economy of manufacture with assured uniformity of size, shape, weight, and, very importantly, balance. Moreover, because of its assured symmetry, the stick is equally suitable for use by right-handed and left-handed players and by those who are ambidextrous, at least in the playing of the game. The stop 5, shaped and positioned as shown, minimizes the wedging of balls in the lower part of the netting. The head and stop material is completely unaltered by weather conditions.

FIGURES 8–15 illustrate an attack stick embodying the invention. The attack stick is basically similar to the defense stick shown in FIGURES 1–7, but differs slightly in shape, proportions and size. The attack and defense sticks being drawn to the same scale, comparisons as to relative sizes and precise configurations are readily ascertainable from the drawings. Since the attack stick shown in FIGURES 8–15 comprises components having counterparts in the defense stick shown in FIGURES 1–7, the same reference numberals applied to FIGURES 1–7 are applied to corresponding components in FIGURES 8–15 illustrating the attack stick.

Some of the differences between the attack and defense sticks which render them respectively more particularly adapted for use by attack and defense players will be referred to briefly. The side walls 2, 2 of the attack stick shown in FIGURES 8–15 are slightly dished inwardly as viewed in front elevation, whereas the side walls in the defense stick have substantial extents of relative flatness. The attack stick side walls 2, 2 are dished inwardly in cross section on their inner surfaces so as to maintain a channel-like configuration, but without the distinct channel bottom and sides characterizing the cross section of the side walls in the defense stick. The attack stick top wall 3 is curved throughout rather than having a substantial extent of flatness as in the defense stick. In the attack stick, the side walls 6 of the stop 5 do not extend upwardly as far as the corresponding stop side walls in the defense stick. The layer of soft resilient material 16 in the attack stick terminates below the center of the stick head pocket as compared to the higher extension of the layer 16 in the defense stick. Only three longitudinal netting thongs 8 are employed in the attack stick as distinguished from the four in the defense stick netting.

The materials employed in constructing the attack stick shown in FIGURES 8–15 are the same as those constituting the defense stick and have the same physical properties.

The constructions shown and described embody the invention in preferred forms, but it is intended that the disclosure be illustrative rather than definitive, the invention being defined in the appended claims.

We claim:

1. A lacrosse stick comprising a substantially shatter-proof generally V-shaped head having two side walls joined at their lower ends by a throat and diverging upwardly and outwardly from each other and being connected at their upper ends by a transverse top wall, said head being formed of elastomer characterized by toughness, impact resistance and limited flexibility, and having minimum physical properties substantially: tensile strength 11,000 p.s.i.; elongation at break 270% (both ASTM D–412–61T—rate of pull 1 inch per minute); impact resistance, foot-pounds/inch 15 (ASTM D–256–56, Method A, notched Izod); resilience, rebound Bashore percent 48; and flexural modulus (ASTM D–797) 114,500 p.s.i. (ASTM D–797-58 75° F., 75 mils thick sample), in combination with a handle connected to said throat.

2. A lacrosse stick according to claim 1 in which said side walls are channel shaped in cross section.

3. A lacrosse stick according to claim 2 in which the depressions in the channel shaped cross sections of said side walls face toward each other.

4. A lacrosse stick comprising a substantially shatter-proof generally V-shaped head having two side walls joined at their lower ends and diverging upwardly and outwardly from each other and being connected at their upper ends by a transverse wall, said head being formed of elastomer characterized by toughness, impact resistance and limited flexibility and having physical properties substantially: tensile strength 11,000 p.s.i., elongation at break 270% (both ASTM D412–61T—rate of pull 1 inch per minute); and flexural modulus (ASTM D–797) 114,500 p.s.i., (ASTM D797–58), 75° F., 75 mils thick sample).

5. A lacrosse stick comprising a substantially shatter-proof generally V-shaped head having two side walls joined at their lower ends and diverging upwardly and outwardly from each other and being connected at their upper ends by a transverse wall, said head being formed of elastomer characterized by toughness, impact resistance and limited flexibility and having physical properties substantially:

| | | |
|---|---|---|
| Hardness, Shore durometer D | 75 | (ASTM D1484–59). |
| 100% modulus, p.s.i. | 4,300 | (ASTM D412–61T |
| Tensile strength, p.s.i. | 11,000 | Rate of pull is |
| Elongation at break, percent | 270 | 1 inch per minute). |
| Tear strength, lb./in | 116 | (ASTM D470–59T). |
| Compression set, percent | 9 | (ASTM D395–61, Method A, 22 hours at 158° F. under 1,350 p.s.i. load). |
| Abrasion resistance (NBS index) | 435 | (ASTM D1630–61, National Bureau of Standards Abrader). |
| Flexural modulus, p.s.i. | 114,500 | (ASTM D797–58, 75° F., 75 mils thick sample). |
| Impact resistance, foot-pounds/inch | 15 | (ASTM D256–56 Method A, notched Izod). |
| Resilience, rebound Bashore, percent | 48 | |

6. A lacrosse stick according to claim 1 in which a layer of relatively soft, resilient material is positioned on the inner faces of said side walls.

7. A lacrosse stick according to claim 6 in which said side walls are channel shaped in cross section, the depressions in said channels facing toward each other, and in which said layer of relatively soft resilient material lies within said depressions and extends inwardly toward the center of said head beyond said depressions.

8. A lacrosse stick according to claim 7 in which said relatively soft resilient material is a foamed elastomer.

9. A lacrosse stick comprising a generally V-shaped head having two side walls joined by a throat at their lower ends and diverging upwardly and outwardly from each other and being connected at their upper ends by a transverse top wall, said side walls being channel shaped in cross section and the depressions in the channel shaped sections facing toward each other; and a layer of relatively soft, resilient material positioned on the inner faces of said side walls, lying within said depressions, and extending inwardly toward the center of the head beyond said depressions.

10. A lacrosse stick comprising a generally V-shaped head having two side walls joined at their lower ends by a throat and diverging upwardly and outwardly from each other; transverse top wall connecting the upper ends of said side walls; and a stop within and spanning the space between said head side walls at the lower part of said head, said stop having stop side walls which are joined to each other by a root at the bottom of the stop and diverging upwardly and outwardly from each other and being respectievly joined adjacent their upper ends to the inside surfaces of said head side walls, said stop root being spaced from said throat toward said transverse top wall; and a handle extending through said throat and into said stop root.

11. A lacrosse stick according to claim 10 in which said stop is generally V-shaped with the convergence of said stop side walls at their lower portions forming said root.

12. A lacrose stick according to claim 10 in which said stop side walls are slightly curved with their concave inner surfaces facing each other and extend upwardly toward said transverse top wall.

13. A lacosse stick according to claim 10 including a layer of resilient material, relatively soft as compared to the material of said head and stop, secured to the inner surface of said stop and extending upwardly beyond the tops of said stop side walls and along the inner surfaces of said head side walls to a location adjacent said transverse top wall and being secured to said head side wall inner surfaces.

14. A lacrosse stick according to claim 13 in which said relatively soft resilient material is a foamed elastomer.

15. A lacrosse stick according to claim 10 in which said head, including said head side walls, said transverse top wall and said stop, are formed of elastomer characterized by toughness, impact resistance and flexibility.

16. A lacrosse stick comprising a generally V-shaped head having two side walls joined at their lower ends and diverging upwardly and outwardly from each other; a transverse top wall connecting the upper ends of said side walls; and a stop within and spanning the space between said head side walls at the lower part of said head, said stop having side walls joining each other at the bottom of the stop and diverging upwardly and outwardly from each other and being respectively joined adjacent their upper ends to the inside surfaces of said head side walls, said head, including said head side walls, said transverse top wall and said stop being formed of elastomer characterized by toughness, impact resistance and flexibility and having physical properties substantially: tensile strength 11,000 p.s.i.; elongation at break 270% (both ASTM D412–61T—rate of pull 1 inch per minute); and flexural modulus (ASTM D–797) 114,500 p.s.i., (ASTM D797–58, 75° F., 75 mils thick sample).

17. A lacrosse stick comprising a generally V-shaped head having two side walls joined at their lower ends and diverging upwardly and outwardly from each other;

a transverse top wall connecting the upper ends of said side walls; and a stop within and spanning the space between said head side walls at the lower part of said head, said stop having side walls joining each other at the bottom of the stop and diverging upwardly and outwardly from each other and being respectievly joined adjacent their upper ends to the inside surfaces of said head side walls, said head, including said head side walls, said transverse top wall and said stop being formed of elastomer characterized by toughness, impact resistance and flexibility and having physical properties substantially:

| | | |
|---|---|---|
| Hardness, Shore durometer D | 75 | (ASTM D1484–59). |
| 100% modulus, p.s.i | 4,300 | (ASTM D412–61T Rate of pull is 1 inch per minute). |
| Tensile strength, p.s.i | 11,000 | |
| Elongation at break, percent | 270 | |
| Tear strength, lb./in | 116 | (ASTM D470–59T). |
| Compression set, percent | 9 | (ASTM D395–61, Method A, 22 hours at 158° F. under 1350 p.s.i. load). |
| Abrasion resistance (NBS index) | 435 | (ASTM D1630–61, National Bureau of Standards Abrader). |
| Flexural modulus, p.s.i | 114,500 | (ASTM D797–58, 75° F., 75 mils thick sample). |
| Impact resistance, foot-pounds/inch | 15 | (ASTM D256–56 Method A, notched Izod). |
| Resilience, rebound Bashore, percent | 48 | |

18. A lacrosse stick comprising a generally V-shaped head having two side walls joined at their lower ends and diverging upwardly and outwardly from each other, a transverse top wall connecting the upper ends of said side walls, and a stop within and spanning the space between said head side walls at the lower part of said head, said stop having stop side walls joining each other at the bottom of the stop and diverging upwardly and outwardly from each other and being respectively joined adjacent their upper ends to the inside surfaces of said head side walls; and a handle extending through the jointure of said head side walls into the bottom of said stop and being detachably connected to said head.

19. A lacrosse stick head comprising a lower end for connection to a handle, at least one side wall extending upwardly from said lower end and inclined outwardly, and a top wall integral with and extending transversely from the upper end of said side wall, said walls being formed of elastomer characterized by toughness, impact resistance, and limited flexibility, and having minimum physical properties substantially: tensile strength 11,000 p.s.i.; elongation at break 270% (both ASTM D–412–61T—rate of pull 1 inch per minute); impact resistance, foot-pounds/inch 15 (ASTM D–256–56, Method A, notched Izod); resilience, rebound Bashore percent 48; and flexural modulus (ASTM D–797) 114,500 p.s.i. (ASTM D–797–58 75° F., 75 mils thick sample).

20. A lacrosse stick head comprising a lower end for connection to a handle, at least one side wall extending upwardly from said lower end and inclined outwardly, and a top wall integral with and extending transversely from the upper end of said side wall, said walls being formed of an elastomer having physical properties substantially:

| | | |
|---|---|---|
| Hardness, Shore durometer D | 75 | (ASTM D1484–59). |
| 100% modulus, p.s.i | 4,300 | (ASTM D412–61T Rate of pull is 1 inch per minute). |
| Tensile strength, p.s.i | 11,000 | |
| Elongation at break, percent | 270 | |
| Tear strength, lb./in | 116 | (ASTM D470–59T). |
| Compression set, percent | 9 | (ASTM D395–61, Method A, 22 hours at 158° F. under 1350 p.s.i. load). |
| Abrasion resistance (NBS index) | 435 | (ASTM D1630–61, National Bureau of Standards Abrader). |
| Flexural modulus, p.s.i | 114,500 | (ASTM D797–58, 75° F., 75 mils thick sample). |
| Impact resistance, foot-pounds/inch | 15 | (ASTM D256–56 Method A, notched Izod). |
| Resilience, rebound Bashore, percent | 48 | |

(References on following page)

References Cited

UNITED STATES PATENTS

| | | | |
|---|---|---|---|
| 1,570,632 | 1/1926 | Kideney | 273—96 |
| 2,029,790 | 2/1936 | Philipp | 273—96 |
| 2,142,527 | 1/1939 | Pool | 273—96 |
| 2,596,894 | 5/1952 | Frisch | 273—96 |
| 2,969,984 | 1/1961 | Presnick | 273—74 |
| 3,232,614 | 2/1966 | Abbat. | |

ANTON O. OECHSLE, Primary Examiner

M. R. PAGE, Assistant Examiner

U.S. Cl. X.R.

273—73